United States Patent
Yach et al.

(10) Patent No.: US 8,126,842 B2
(45) Date of Patent: Feb. 28, 2012

(54) APPARATUS, AND ASSOCIATED METHOD, FOR SYNCHRONIZING DATABASES CONNECTED BY WAY OF A RADIO AIR INTERFACE

(75) Inventors: David Paul Yach, Waterloo (CA); Barry Warren Linkert, Petersburg (CA); Jie Zhu, Kitchener (CA); Salim Hayder Omar, Waterloo (CA); Piotr K Tysowski, Waterloo (CA); Albert Hecht-Enns, Waterloo (CA); Catherine Phillips, Waterloo (CA); Kathy Ann Pereira, Waterloo (CA)

(73) Assignee: Research In Motion Limited, Waterloo (CA)

( * ) Notice: Subject to any disclaimer, the term of this patent is extended or adjusted under 35 U.S.C. 154(b) by 407 days.

(21) Appl. No.: 10/776,004

(22) Filed: Feb. 10, 2004

(65) Prior Publication Data

US 2005/0177632 A1 Aug. 11, 2005

(51) Int. Cl.
*G06F 7/00* (2006.01)

(52) U.S. Cl. .................. 707/610; 707/697; 707/698

(58) Field of Classification Search .................. 707/610, 707/697, 698, 999.2
See application file for complete search history.

(56) References Cited

U.S. PATENT DOCUMENTS 5,684,990 A 11/1997 Boothby .................. 707/203
(Continued)

FOREIGN PATENT DOCUMENTS

WO 02/054236 A2 7/2002

OTHER PUBLICATIONS http://www.accuhash.com/what-is-checksum.html.*
(Continued)

*Primary Examiner* — Robert Timblin

(57) ABSTRACT

A synchronization process, and associated apparatus, for placing database copies in match with one another by way of communications effectuated upon an air interface of a radio communication system. Hash functions are performed at a mobile node and at a network part upon mobile and network copies of database information. Comparison of the hash information formed therefrom provides a preliminary indication of whether the databases are in match with one another. If a determination is made that the databases are out of match, the data is compared, and the data is placed in match with one another responsive to such additional comparisons.

18 Claims, 4 Drawing Sheets

U.S. PATENT DOCUMENTS

| | | | | |
|---|---|---|---|---|
| 5,809,494 | A * | 9/1998 | Nguyen | 1/1 |
| 6,286,032 | B1 * | 9/2001 | Oberlander et al. | 709/203 |
| 6,324,542 | B1 | 11/2001 | Wright, Jr. et al. | |
| 6,449,613 | B1 * | 9/2002 | Egolf et al. | 1/1 |
| 6,470,329 | B1 * | 10/2002 | Livschitz | 707/1 |
| 6,771,951 | B1 * | 8/2004 | Leonetti | 455/414.1 |
| 7,062,704 | B2 * | 6/2006 | Talagala et al. | 714/819 |
| 7,133,963 | B2 * | 11/2006 | Gilfix et al. | 711/108 |
| 7,249,255 | B2 * | 7/2007 | Anand | 713/168 |
| 2002/0029214 | A1 * | 3/2002 | Yianilos et al. | 707/7 |
| 2002/0046296 | A1 * | 4/2002 | Kloba et al. | 709/248 |
| 2002/0059256 | A1 | 5/2002 | Halim et al. | |
| 2002/0059299 | A1 | 5/2002 | Spaey | 707/104.1 |
| 2003/0005306 | A1 * | 1/2003 | Hunt et al. | 713/181 |
| 2003/0037020 | A1 * | 2/2003 | Novak et al. | 707/1 |
| 2004/0162853 | A1 * | 8/2004 | Brodersen et al. | 707/104.1 |
| 2004/0246902 | A1 * | 12/2004 | Weinstein et al. | 370/238 |
| 2005/0037787 | A1 * | 2/2005 | Bachner et al. | 455/502 |
| 2005/0071386 | A1 * | 3/2005 | Wolfgang et al. | 707/201 |

OTHER PUBLICATIONS

Seshadri et a: "SQLServer for Windows CE-a database engine for mobile and embedded platforms"; Data Engineering, 2000. Proceedings. 16th International Conference on San Diefo, CA, USA Feb. 29-Mar. 3, 2000, Los Alamitos, CA, USA, IEEE Comput. Soc, US, pp. 642-644, XP010378761.

* cited by examiner

APPARATUS, AND ASSOCIATED METHOD, FOR SYNCHRONIZING DATABASES CONNECTED BY WAY OF A RADIO AIR INTERFACE

The present invention relates generally to a manner by which to place, and maintain, a database embodied at a mobile node in match with a corresponding database embodied at a communication network. More particularly, the present invention relates to apparatus, and an associated method, by which to determine whether the databases are in match with one another and to place the databases in match if the databases are determined to be out-of-match.

Communications between the mobile node and the network by way of an air interface are carried out in manners requiring lessened amounts of channel capacity to carry out the determination and, if needed, place the databases in match with one another. Hash information is first utilized, preliminarily, to determine whether the databases are in match with one another, requiring, thereby minimal bandwidth upon the air interface. And, when the databases are out-of-match, a conflict resolution scheme is used to place the databases in match with one another.

BACKGROUND OF THE INVENTION

Data communication services are an endemic part of modern society. Many varied functions and services require, for their practical effectuation, that data be communicated quickly and accurately. Such functions and services sometimes require that the data be communicated over significant distances between spaced-apart communication stations.

Most simply, a communication system includes a first communication station, forming a sending station, that sends data upon a communication channel to a second communication station, forming a receiving station. Many different types of communication services are regularly effectuated between many sets of communication stations, pursuant to point-to-point or point-to-multipoint communication services. Many varied types of communication systems have been developed and implemented. And, with advancements in technologies, additional communication systems, providing expanded communication services and capabilities, are under development. A radio communication system is an exemplary type of communication system. In a radio communication system, the communication channel that is formed between sending and receiving stations comprises a radio communication channel, defined upon a radio link formed between the communication stations. A wireline connection, otherwise required to interconnect the communication stations, is obviated as the communication channel is defined upon the radio link rather than a wireline.

Concomitant with the advancements in technologies is a merging of technologies. That is to say, previously disparate technology areas are merging together. Advancements in one technology, increasingly, also provide benefit to other technology areas.

For instance, data processing is also an endemic part of modern society. Advancements in computer, and data-processing related technologies, have also been implemented, and data processing systems are available that permit large amounts of data to be stored and processed.

Communication systems are regularly used by which to transport data that is to be stored, or processed. Technologies used for data processing are, increasingly, used during operation of communication systems. And, technologies utilized in communication systems are increasingly used in data processing systems. Communication devices, and systems permitting the use of such devices, are available by which to perform various data processing operations and communication services. Additional applications and services shall likely become available in the future.

Portable data storage and processing devices, sometimes referred to as personal digital assistants (PDAs), are exemplary of data processing devices that are widely utilized. Databases are stored at such devices, and the data stored thereat is selectably retrievable by a user of the device. The data forms a series of data records, each data record containing one or more fields. During operation of the device, the data is retrieved and displayed, or otherwise made available to the user, in a desired manner. Sorting, and other, processing operations are also selectably performed upon the data contained at one or more databases of the device. The data is further selectably changeable by a user of the device.

Manners are provided by which to back-up the data stored at the portable device. By backing-up the device, the data can be recovered in the event of loss of the data at the portable device. Various personal digital assistants, and other data storage and processing devices, provide manners by which to back-up the data upon personal computers or other computing stations, by way of a fixed connection formed therebetween. Once the data is stored at the personal computer, or other computing station, the stored data of the database stored thereat is also updateable, i.e., changeable, thereat.

When the data is stored at the separate locations, i.e., at the portable device and at the computer back-up device, change of any portion of the data stored in the database stored at either of such devices causes the respective databases no longer fully to be copies of one another. Subsequent synchronization of the databases is required to place the databases in conformity with one another. Synchronization operations are performed, for instance, during subsequent back-up operations in which the contents of the respective databases are compared to one another. And, responsive to the comparisons, portions of the data found to be out-of-match are altered to place the databases in match with one another.

Other portable devices provide for back-up of the stored data to a computing station by way of a radio air interface. Back-up and synchronization operations performed by way of a radio air interface are, however, more problematical due to the bandwidth limitations generally associated with radio communication systems. Conventional manners by which to back-up, and synchronize, data stored at the respective databases are, as a general rule, prohibitively bandwidth consumptive.

If a manner could be provided by which better to provide for the back-up and synchronization of the data of dynamically-alterable databases, use of a radio communication system through which to back-up and maintain the databases in-match with one another would be facilitated.

It is in light of this background information related to synchronization of data contents of databases that the significant improvements of the present invention have evolved.

SUMMARY OF THE INVENTION

The present invention, accordingly, advantageously provides apparatus, and an associated method, by which to place, and maintain, a database embodied at a mobile node in match with a corresponding database embodied at a communication network.

Through operation of an embodiment of the present invention, a manner is provided by which to determine whether the databases are in match with one another and to place the databases in match if the databases are determined to be out-of-match.

Communications are effectuated by way of an air interface extending between the mobile node and the network. The communications are carried out in manners that require lessened amounts of channel capacity to carry out the determination process and to place the databases in match with one another.

Preliminary determinations of whether the databases are in match with one another are made responsive to comparison of hash information that is representative of values contained in the respective databases. Separate hash information is formed at the mobile node and at the network based upon the respective databases embodied thereat, respectively. The hash information formed at the mobile node is communicated by way of the air interface to the network part. And, once delivered to the network part, the hash information, formed at the mobile node, is compared with corresponding hash information, formed at the network part. Communication of the hash information over the air interface necessitates only minimal bandwidth consumption.

If a determination is made that the databases are out-of-match based upon the comparisons of the respective hash information, additional determinations, based upon additional hash information, are made. If the additional determinations indicate that the databases are out-of-match, selected portions of the databases are communicated over the air interface and the database portions are compared with each other. Responsive to such comparisons, and pursuant to a conflict resolution scheme, conflicting portions of the databases are altered, thereby to place the databases in match with one another.

In one aspect of the present invention, synchronization operations are triggered when the respective databases are suspected to be in a state of mismatch, i.e., the databases are suspected to be out of synchronization, or out-of-match with one another. The synchronization procedure is triggered by either the network part or the mobile node. The synchronization procedure is triggered, for instance, if the network part loses a history of changes listing that would otherwise be utilized pursuant to performance of a synchronization procedure in another manner. The synchronization procedure is triggered by the mobile node, for instance, when a field mapping listing changes. Also, the mobile node triggers the synchronization process when a restore operation is performed upon the database at the mobile node.

Upon triggering of the synchronization process, the hash information representative of the database, or databases, believed to be in mismatch is created and communicated to the network part.

In another aspect of the present invention, the mobile node includes a functional entity forming a hash information generator. The hash information generator is selectably operable to create hash information pursuant to a first technique and pursuant to at least a second technique. The first technique is less computationally-intensive and forms hash information requiring lesser amounts of communication channel capacity upon which to communicate the hash information over the air interface than the hash information created pursuant to the second technique. Hash information is first created pursuant to the first technique. If, subsequently, a preliminary determination is made, responsive to analysis of the hash information created pursuant to the first technique, that the databases at the mobile node and the network part are out-of-match, hash information is then created pursuant to the second technique.

And, the additional hash information is communicated by the mobile node to the network part for the additional analysis to be made thereof.

In another aspect of the present invention, the mobile node also includes a content retriever that is selectably operable to retrieve at least selected portions of the database or databases embodied at the mobile node. The content retriever retrieves the selected portions of the content of a database responsive to determination, upon analysis of the additional hash information that the databases appear to be out-of-match. And, once retrieved, the data is communicated by way of the air interface to the network for final determination as to whether the databases are in-match or out-of-match with one another.

In another aspect of the present invention, functional elements are provided at the network part to form sync server or other apparatus to facilitate the synchronization of the databases of the mobile node and the network part. A comparator is coupled to receive indications of the hash information communicated to the network part by the mobile node. Corresponding, locally generated hash information is used by the comparator to perform the comparisons. If the comparison indicates that the databases are out-of-match with one another, the comparator causes a request for additional information to be generated. In an implementation in which hash information is formed pursuant to a first technique and at least a second technique, the request for the additional information is dependent upon which hash information-type has been compared. If the first-type hash information is compared, the request for further information is a request for hash information formed pursuant to the second technique. And, if the hash information that has been compared is the second-type hash information, the request for the additional information forms a fetch request requesting contents of the data of the database.

When the content of the database, or databases, at the mobile node is fetched and returned to the network part, the comparator further compares the contents with the corresponding, locally-stored contents. If the contents are dissimilar, the contents of one, or the other, of the databases is selectably altered. Selection of which of the databases is to be overwritten, and in what situations the contents are to be overwritten is made pursuant to a conflict resolution scheme. Thereby, the databases are caused to be placed in match with one another.

Thereby, a synchronization procedure is provided by which to maintain the databases embodied at the mobile node and at the network part of the radio communication system. The databases are maintained in synchronization with one another while utilizing reduced amounts of bandwidth of the air interface interconnecting the mobile node and the network part. More efficient use of the channel capacity available in the radio communication system is used to perform synchronization operations.

In these and other aspects, therefore, apparatus, and an associated method, is provided for a radio communication system. The radio communication system has a network part that maintains at least a network-copy, first database containing data and a mobile node that maintains at least a mobile-copy, first database containing data. The data of the network-copy and of the mobile-copy of the at least the first database, respectively, correspond when the network-copy and the mobile-copy of the databases are in match with one another. Data of at least one of the network-copy and the mobile-copy of the at least the first database is selectably altered to place the network-copy and the mobile-copy in match with each other. A hash generator is embodied at the mobile node. The hash generator is adapted to receive representations of at least portions of the mobile-copy first database. The hash generator selectably forms hash values responsive to the representations provided thereto. The hash values are for communication to the network part to determine whether the network-copy and the mobile-copy are in match with one another. A content retriever is embodied at the mobile node. The content retriever retrieves data from the mobile-copy of the at least the first database upon detection of determination that the network-copy and the mobile-copy are out-of-match. The data retrieved by the content retriever is for communication to the network part to be used to match the network-copy and the mobile-copy theretogether.

A more complete appreciation of the present invention and the scope thereof can be obtained from the accompanying drawings that are briefly summarized below, the following descriptions of the presently-preferred embodiments of the invention, and the appended claims.

DETAILED DESCRIPTION

Figure 1:
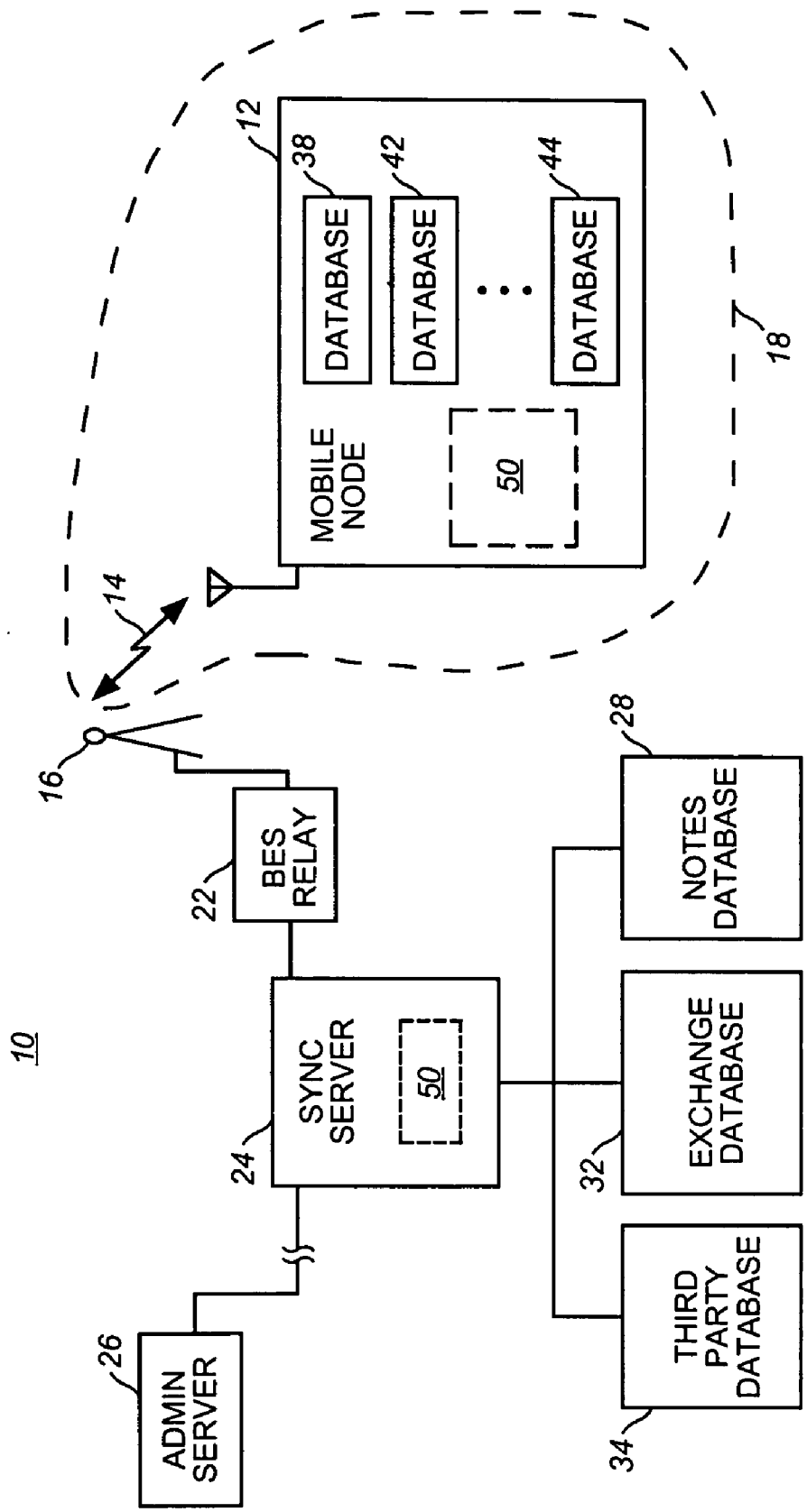
FIG. 1 illustrates a functional block diagram of a radio communication system in which an embodiment of the present invention is operable.

Referring first to FIG. 1, a radio communication system, shown generally at 10, provides for radio communications with mobile nodes, of which the mobile node 12 is exemplary. Communication services are effectuated with the mobile node during operation of the communication system. Data originated at the mobile node is selectably communicated by way of up-links defined upon a radio link extending between the mobile node and a network part of the communication system. And, data originated at the network part of the communication system is communicated by way of down-links defined upon the radio link 14 to provide data to the mobile node.

For purposes of illustration, the network part of the communication system is functionally represented, and here a single base station 16 illustrated. The base station 16 defines a coverage area, or cell, 18 within which communications with the mobile node are generally effectuable. The mobile node is permitted movement, and the mobile node is positionable, at other times, in coverage areas defined by other cells. The network part of the communication system also includes a relay device 22, here identified as a Blackberry™ Enterprise Server (BES) relay, and a synchronization (sync) server. The functions provided by the relay 22 and the server 24 are, in the exemplary implementation, embodied on the same device, or platform. And, the sync server 24 is coupled to an administration (admin) server 26. The administration server provides administrative services to the communication system and, for instance, provides administrative control over the sync server.

The sync server is functionally coupled to databases, of which three exemplary database-types are shown in the Figure. Lotus™ Notes database 28, an Exchange™ connector for an Exchange-based database 32 as well as other types, here indicated as third-party databases 34. The databases are, here in the exemplary implementation, of a text format, here an extensible mark-up language (XML) format. The data maintained at the databases 28, 32, and 34, as well as others, are formed of a plurality of data portions, formatted into fields. For instance, the fields into which a database, such as the database 28, is formed includes record fields that are selectably populated with data. Selected ones of the record fields form key fields.

The mobile node also embodies databases, here shown at 38, 42, and 44 that, for purposes of example, correspond to the databases 28, 32, and 34 maintained at, or coupled to, the sync server 24. The databases maintained at both the network part and at the mobile node are at least selectably alterable in asymmetric manner.

During operation of the communication system, back-up of the databases created, or otherwise embodied, at the mobile node is performed with the network part. When the databases are in-match with one another, the data populating the fields of the mobile-copy and the network-copy of the same database is identical. However, if an asymmetric change is made to one of the databases and not otherwise reported to the other of the databases, the databases no longer are in-match with one another. Because the copies of the databases form back-ups to each other, synchronization operations are performed to place the respective databases in match with one another. However, because synchronization is performed by way of an air interface, the bandwidth required to perform such synchronization must be minimized. The radio communication system includes apparatus 50 of an embodiment of the present invention. A portion of the apparatus 50 is embodied at the mobile node. And, another portion of the apparatus 50 is embodied at the sync server 24, or other network part, of the communication system.

Figure 2:
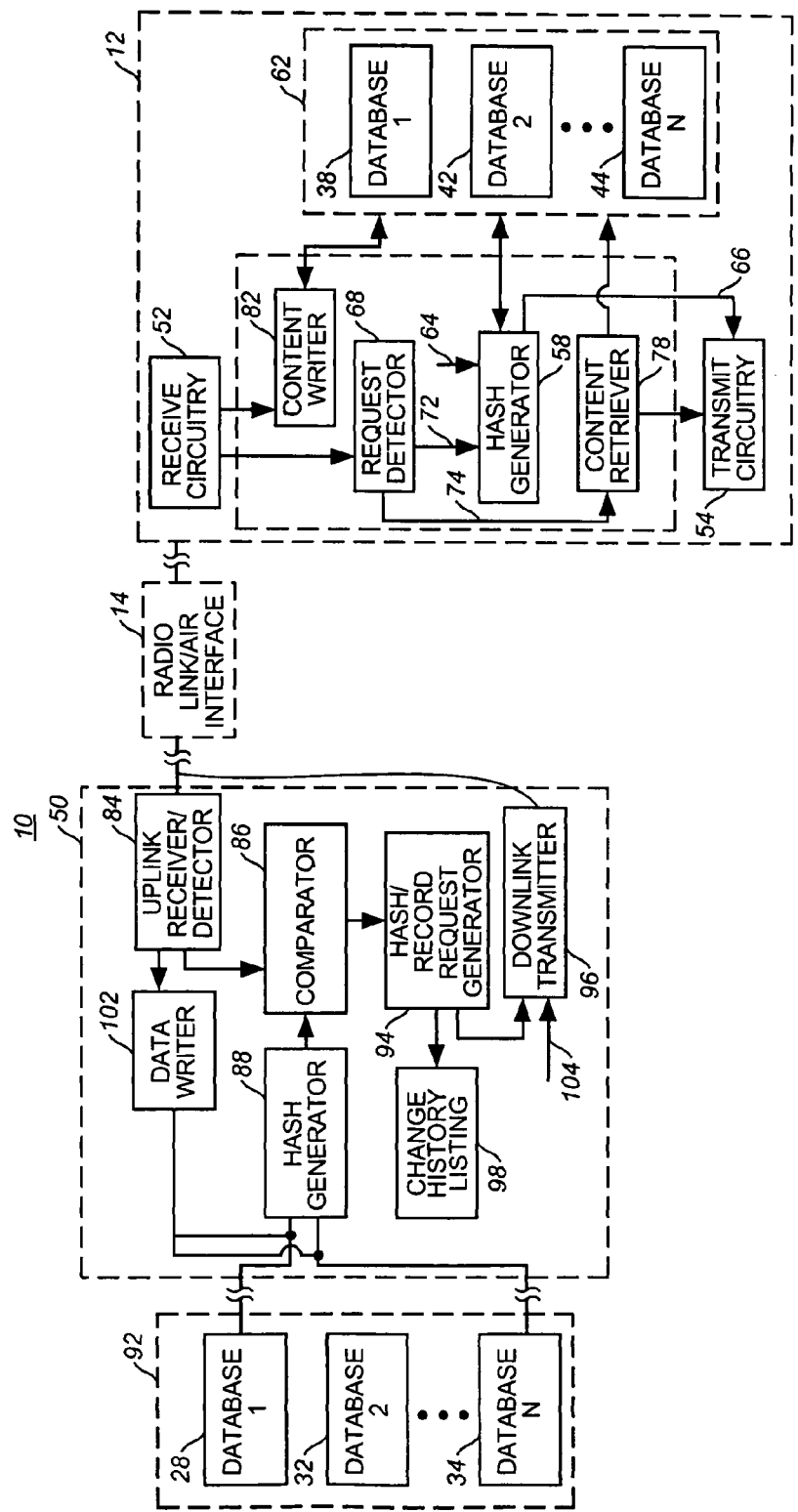
FIG. 2 illustrates a functional block diagram of portions of the radio communication system shown in FIG. 1.

FIG. 2 illustrates portions of the communication system 10. And, more particularly, the Figure illustrates portions of the sync server 24 and the mobile node 12. Communications are effectuated between the sync server and the mobile node by way of a communication path, including a portion formed upon an air interface extending between the network part of the communication system and the mobile node.

Here, the mobile node is shown to include receive circuitry 52 and transmit circuitry 54 capable of transceiving communication signals containing data that are communicated during operation of the communication system. The apparatus 50 is coupled to both the receive circuitry and to the transmit circuitry. The apparatus 50 embodied at the mobile node is represented in terms of functional elements. The functions performed by the functional entities are carried out in any desired manner, such as by algorithms executable by processing circuitry. In other implementations, the functions performed by the various entities are carried out in other manners.

Here, the apparatus includes a hash generator 58. The hash generator is coupled to a memory element 62 at which the databases 38, 42, and 44 are maintained. The hash generator is selectably operable to retrieve contents from one or more of the databases maintained at the memory element 62 to perform hash functions to place the accessed data in short-digest form. The hash functions performed by the hash generator include, for instance, computation of check sums as well as more computationally intensive, hash function computations. The hash generator is selectably operable responsive to a trigger signal, here represented to be applied to the hash generator by way of the line 64. Hash information formed by the hash generator is provided to the transmit circuitry, here indicated by way of the path 66. The transmit circuitry transmits the hash information provided thereto to the network part of the communication system, and the transmitted information is routed to the sync server 24.

The apparatus 50 embodied at the mobile node also includes a request detector 68 that is coupled to the receive circuitry 52. The request detector operates to detect requests communicated to the mobile node for additional information, such as additional hash information or data records stored at one or more of the databases. When the request detector detects a request for additional hash information, the detector notifies the hash generator, here indicated by way of the line 72, to request the additional hash information. And, when the request detected by the detector is for data records, the request is forwarded on, here by way of the line 74, to a content retriever 78. The content retriever operates to retrieve the requested data from the one or more databases maintained at the memory element 62. The content retriever retrieves the requested data and provides such data to the transmit circuitry 54. The transmit circuitry is operable also to transmit the retrieved data to the network part by way of the air interface formed therebetween.

The apparatus 50 embodied at the mobile node further includes a content writer 82. The content writer is coupled to the receive circuitry to receive data downloaded thereto to be written into or overwritten upon one or more of the databases maintained at the memory element 62.

The portion of the apparatus 50 embodied at the sync server 24 includes an uplink receiver and detector 84. The receiver and detector operates to detect communications generated by the mobile node pursuant to the synchronization procedures. The receiver and detector selectably provides data detected thereat to a comparator 86. The comparator 86 is also coupled to a hash generator 88 that is coupled to a memory element 92 at which the databases 28, 32, and 34 are maintained. The hash generator 88 operates in manners analogous to operation of the hash generator 58 embodied at the mobile node. When hash information is delivered to the detector 84 and provided to the comparator 86, the comparator 86 compares the values, calculated at the mobile, together with the locally generated hash information. Results of the comparisons made by the comparator 86 are provided to a hash and data record request generator 94. The generator 94 is selectably operable responsive to the results of the comparisons made by the comparator 86 to request additional information from the mobile node. Such requests are provided to a downlink transmitter 96. The apparatus also includes a change history listing 98 at which a listing is maintained of changes made to any of the databases embodied at the respective memory elements of the sync server and the mobile node. The change history listing is accessed during subsequent synchronization operations to reduce the need otherwise to communicate information over the air interface between the mobile node and the sync server.

The apparatus 50 embodied at the sync server also includes a data writer and overwriter 102 coupled to the uplink receiver and detector and comparator 84 and 86. The data writer is selectably operable to write, and overwrite, data into any of the databases maintained at the memory element 92.

Figure 3:
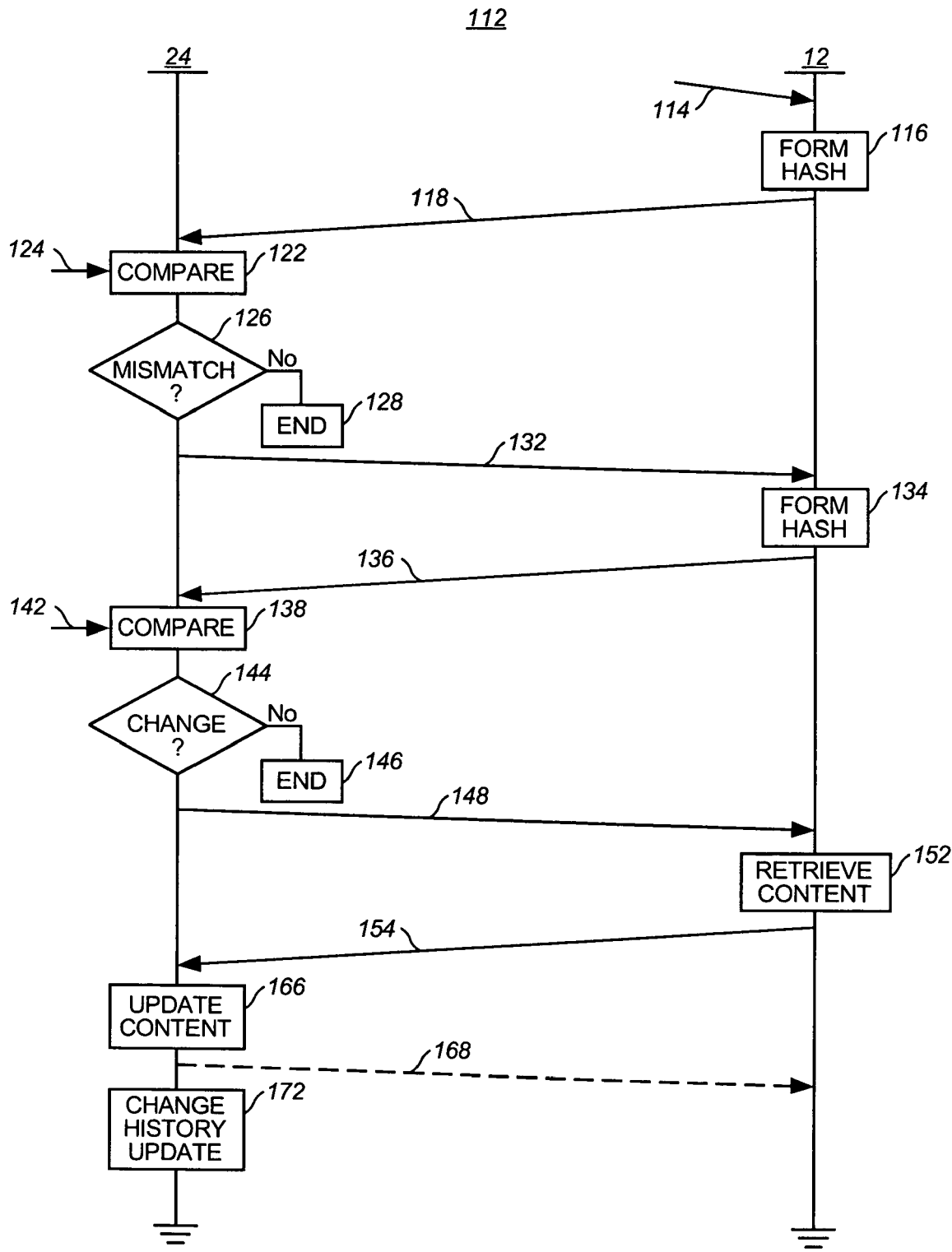
FIG. 3 illustrates a message sequence diagram showing the signaling generated during operation of the radio communication system shown in FIGS. 1-2.

FIG. 3 illustrates a message sequence diagram, shown generally at 112, that illustrates operation of the communication system pursuant to the synchronization procedures of an embodiment of the present invention. Database copies maintained at the mobile node 12 and at the sync server 24, or other network part, are placed, or maintained, in match with one another. The procedure is initiated by a synchronization trigger, here indicated by the segment 114. The trigger is generated, for instance, at the mobile node or at the network part and delivered to the mobile node. Responsive to the triggering of the procedure, the mobile generates hash information, here indicated by the block 116, based upon data contained in one or more of the databases maintained at the mobile node.

Once formed, the hash information is communicated to the network part, indicated by the segment 118, by way of the air interface, and routed to the sync server. Once delivered to the sync server, the hash information is compared, as indicated by the block 122, with corresponding, locally-generated hash information, here indicated to be provided by way of the segment 124.

A determination is made, as indicated by the decision block 126, as to whether a mismatch is detected. That is to say, a determination is made as to whether the locally-generated hash information and the hash information delivered to the sync server by the mobile node are dissimilar. If the hash information indicates that the databases are in match, the no branch is taken to the end block. Otherwise, if a mismatch condition is indicated, a request is generated, indicated by the segment 132, requesting additional hashes, such as hash information of records maintained at the mobile-node copy of the one or more databases maintained at the mobile node. Once delivered to the mobile node, the requested hash information is formed, indicated by the block 134. And, such additional hash information is returned, indicated by the segment 136, to the network part and routed to the sync server 24.

When delivered to the sync server, the additional hash information is compared, as indicated by the block 138, with locally-generated hash information, indicated on the line 142. A determination is made, indicated by the decision block 144, as to whether the data, of which the additional hash information is representative, has changed. If not, the no branch is taken to the end block 146. Otherwise, if a change is indicated, a fetch request is generated by the sync server and communicated, indicated by the segment 148, to the mobile node. Determinations are also made, also indicated by the block 138, of whether data is to be downloaded to the mobile node. Determinations of what, if any, data is to be downloaded is based upon the type of synchronizations that are to be performed. Exemplary syhnchronization possibilities are noted below with respect to FIGS. 4-6. When data is to be sent to the mobile node, data is, e.g., 'piggybacked' together with the fetch request.

Once delivered to the mobile node, the requested data, if any, is retrieved, indicated by the block 152 and returned, indicated by the segment 154, to the sync server. And, the database is updated, as appropriate, as indicated by the block 166. The segment 168 is representative of a 'sync ok' indication returned to the mobile node. And, a change history listing is updated, indicated by the block 172, to maintain a listing of the update.

Review of the message sequence diagram indicates that database information is sent by the mobile node to the sync server upon initiation of the synchronization process. The synchronization server compares the database hashes provided thereto together with locally-generated hash information. Any mismatch between the hash information indicates to the sync server that a particular database must be involved in a synchronization process.

The synchronization server then requests the mobile node to start sending hash information of all records of selected databases indicated to be in a mismatch. The hash information that is associated per record is, for instance, a hash of the key fields of a record and a hash of the record fields, based upon field mappings.

The hash of key fields of a record is used for matching records of a selected database at the sync server. The hash of the record fields is used to determine whether there has been a change on the record content, which could indicate a possibility that a content conflict resolution policy must be run.

If the sync server determines that a record's changes at the mobile node must be reflected at the sync server, the sync server requests fetching of the record content from the device. The server then applies the content changes, e.g., on the server. The fetch request for records depends upon the conflict resolution scheme that is utilized. The server could as well reflect the server changes by explicitly sending all required updates to the device if the conflict resolution scheme calls for such updating.

Figure 4:
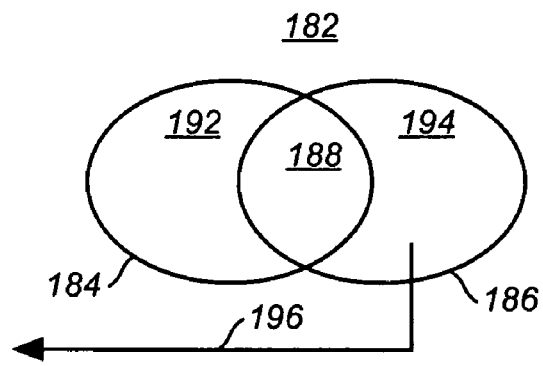
FIG. 4 illustrates a representation of the possible results of a comparison between records of the databases embodied at the network and mobile node pursuant to an exemplary scheme of an embodiment of the present invention.

At least three schemes are selectably utilized. FIG. 4 illustrates a representation one-way sync server to mobile node scheme, shown generally at 182. Mobile node records are indicated by the element 184. And, network maintained records are indicated by the element 186. Intersecting areas of the elements 184 and 186, indicated at 188, indicate shared record changes between the network part and the mobile node. If there is a conflict of any of these shared records, the conflict is resolved, and updates are reflected according to conflict policy settings, i.e., one or the other of the records is updated. The area 192 represents mobile node record changes that do not exist on the server. And, the area 194 represent network located changes that do not exist on the mobile node. The subset of the records of the network should be reflected on the mobile node and are communicated thereto, indicated by the segment 196.

Figure 5:
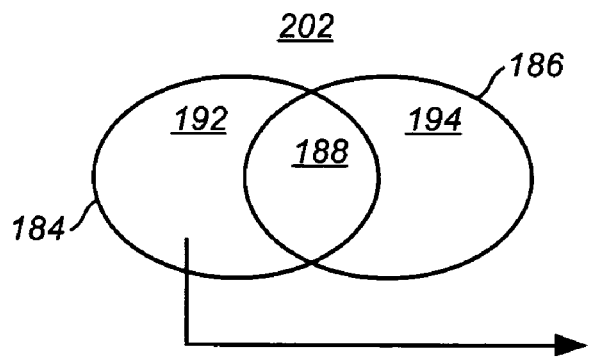
FIG. 5 illustrates a representation, similar to that shown in FIG. 4, but here of another exemplary scheme.

FIG. 5 illustrates a one-way sync to server scenario, shown generally at 202. Here, again, elements 184 and 186 represent mobile node records and network records, respectively. The area 188 represents shared record changes between the mobile node and the network. If there is a conflict of these values, the conflict is resolved according to a conflict resolution scheme. And, the areas 192 and 194 are representative, again, of record changes of records that do not exist on the server and on the device, respectively. The subset of the mobile node's records, represented by the area 192, should be reflected on the server and appropriate updating of the data contents of the associated databases is effectuated.

Figure 6:
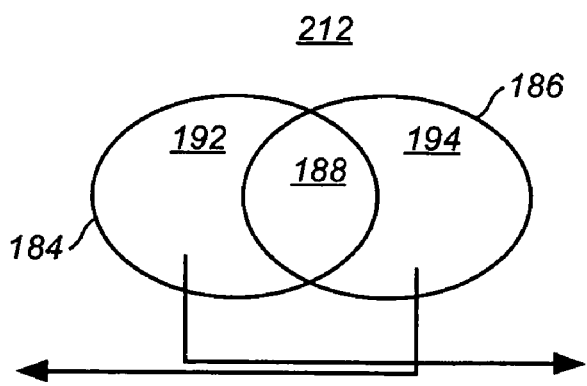
FIG. 6 illustrates another representation, similar to those in FIGS. 4-5, but here of a scheme of another embodiment of the present invention.

FIG. 6 illustrates a representation of a two-way synchronization scheme, shown generally at 212, also representative of a scenario occurring pursuant to operation of an embodiment of the present invention. Again, the elements 184 and 186 are representative of mobile node and server records, respectively. And, the area of intersection of intersection 188 on shared records of which conflicts therebetween are resolved pursuant to a conflict resolution scheme. Here, in a two-way synchronization procedure, the non-shared records, indicated by the area 192 are written to the network-copy of the associated database. And, the non-shared records indicated by the area 194 are written to the associated database of the mobile node.

Thereby, the databases are placed, and maintained, in match with one another. Because hash information is first communicated over the air interface to make preliminary determinations of whether the databases are in match with one another, the bandwidth required upon the air interface to make such determinations is reduced relative to information exchange required of convention synchronization operations.

The previous descriptions are of preferred examples for implementing the invention, and the scope of the invention should not necessarily be limited by this description.

We claim:

1. A mobile node of a radio communication system having a network part and the mobile node, the network part having a network-copy of a database containing database records and database values of the database and the mobile node having a mobile-copy of the database containing database records and database values of the database, the database records and database values of the database of the network-copy and the mobile-copy of the database, respectively, correspond to each other when the network-copy and the mobile-copy of the database are in match with one another, said mobile node comprising:

processing circuitry coupled to the mobile-copy database, said processing circuitry configured to:
i) generate a first hash pursuant to a first hash technique of a first computational intensity and based upon the database values of the mobile-copy database, and communicate said first hash to the network part in a first message on a communications channel of the radio communication system, whereby an out of match condition between the mobile-copy database values and the network-copy database values is determined,
ii) generate, upon a determination of an out of match condition between mobile-copy database values and network-copy database values, a second hash pursuant to a second hash technique of a second computational intensity and based upon the database records in the mobile-copy database, and communicate the entirety of said second hash to the network part in a second message on said communications channel, in which said second computational intensity is greater than said first computational intensity and requires a greater amount of communication channel capacity to communicate said second message than said first message, whereby an out of match condition between a record of the mobile-copy database records and a corresponding record of the network-copy database records is determined, and
iii) retrieve the out of match database record from the mobile-copy database upon a determination of an out of match condition between said mobile-copy database record and said corresponding network-copy database record for communication to the network part, whereby the network-copy database records and the mobile-copy database records are matched to each other;

wherein the radio communication system provides bi-directional data communications services to said mobile node, and wherein data is communicated from the mobile node to the network part by an up-link and, data is communicated from the network part to the mobile node by a down-link.

2. The mobile node of claim 1 wherein said processing circuitry generates said first hash responsive to an external triggering event, occurrence of which is detectable at the mobile node.

3. The mobile node of claim 1 wherein the database records maintained at the network-copy database and the mobile-copy database are comprised of at least a first key field and at least a first record field for each database record, and wherein said second hash comprises a hash of said first key field of each database record.

4. The mobile node of claim 3 wherein the determination that the network-copy database and the mobile-copy database are out of match is made responsive to said second hash.

5. The mobile node of claim 3 wherein the out of match database record retrieved by said processing circuitry comprises both said field and said record field.

6. The mobile node of claim 1 wherein hashes generated by a network part processing circuitry include a first hash pursuant to a first hash technique of a first computational intensity and based upon the database values of the network-copy database, and a second hash pursuant to a second hash technique of a second computational intensity and based upon the database records in the network-copy database.

7. The mobile node of claim 1 further comprising circuitry configured to receive out of match data records responsive a comparison of a second hash of said network-copy database records with a second hash of said mobile-copy database records.

8. The mobile node of claim 7 further comprising database updater circuitry, configured to alter at least one record of a selected one of the mobile-copy database and the network-copy database.

9. The mobile node of claim 8 wherein said database value updater circuitry operates pursuant to a selected conflict resolution protocol.

10. The mobile node of claim 1 wherein said first hash technique comprises a checksum process.

11. A method of communicating in a radio communication system having a network part that maintains at least a network-copy of a database containing database records and database values of the database and a mobile node that maintains a mobile-copy of the database containing database records and database values of the database, the database records and database values of the database of the network-copy and the mobile-copy of the database, respectively, correspond when the network-copy database and the mobile-copy database are in match with one another, the method altering at least one database record of at least one of the network-copy database and the mobile-copy database to place the network-copy and the mobile-copy in match with each other, the method comprising:
    generating at the mobile node a first hash pursuant to a first hash technique of a first computational intensity and based upon the database values of the mobile-copy database, when the network-copy database and the mobile-copy database are suspected of being out of synchronization with each other;
    sending said first hash value from the mobile node to the network part in a first message on a communications channel of the radio communication system, whereby an out of match condition between the mobile-copy database values and the network-copy database values is determined;
    receiving, at the mobile node, indication of results of a comparison at the network part, of said first hash value sent during said operation of sending, to a corresponding network-copy of said first hash value; and
    when said indication of results of the comparison of said first hash value generated at the mobile node to a corresponding network-copy of said first hash value indicates that the mobile-copy database and the network copy database are out of match, thereafter generating a second hash at the mobile node pursuant to a second hash technique of a second computational intensity and based upon the database records in the mobile-copy database, in which said second computational intensity is greater than said first computational intensity and requires a greater amount of communication channel capacity to communicate said second hash than said first hash; and
    sending said second hash value in its entirety from the mobile node to the network part in a second message on said communications channel for comparison to a corresponding network-copy of the second hash value, whereby an out of match condition between a record of the mobile-copy database records and a corresponding record of the network-copy database records is determined;
    wherein the radio communication system provides bi-directional data communications services to the mobile node, and wherein data is communicated from the mobile node to the network part by an up-link and, data is communicated from the network part to the mobile node by a down-link.

12. The method of claim 11 further comprising the operations of delivering the mobile-copy database records to the network part, comparing said delivered records with corresponding records of the network-copy database records, and causing overwriting of at least portions of a selected one of the network-copy database records and the mobile-copy database records responsive to a determination of an out of match condition between a record of the mobile-copy database records and a corresponding record of the network-copy database records.

13. The method of claim 12 wherein the selected one of the network-copy database records and the mobile-copy database records of which said portions thereof are caused to be overwritten is selected according to a conflict resolution scheme.

14. The method of claim 13 further comprising the operation of creating a change-history by indicating overwriting of the portions selectively caused during said operation of selectively causing.

15. The method of claim 11 wherein said generating a first hash further comprises generating a first hash pursuant to a checksum process.

16. A mobile node of a radio communication system having a network part and the mobile node, the network part having a network-copy of a database containing database records and database values of the database and the mobile node having a mobile-copy of the database containing database records and database values of the database, the database records and database values of the database of the network-copy and the mobile-copy of the database, respectively, in correspondence with each other when the network-copy database and the mobile-copy database are in match with one another, said mobile node comprising:
    receive circuitry configured to receive signals transmitted by a network part transmitter;
    transmit circuitry configured to transmit signals to a network part on a communications channel;
    a memory element storing at least one mobile-copy database; and
    processing circuitry coupled to said receive circuitry, said transmit circuitry, and said memory element, and including:
    a request detector,
    a hash generator to generate, in response to said request detector detecting an external triggering event, a first hash pursuant to a first hash technique of a first computational intensity and based upon the database values of the mobile-copy database, said first hash being communicated to the network part in a first message via said transmit circuitry on said communications channel, whereby an out of match condition between the mobile-copy database values and the network-copy database values is determined, and to generate, upon a determination of an out of match condition between mobile-copy database values and network-copy database values being received from the network part via said receive circuitry, a second hash pursuant to a second hash technique of a second computational intensity and based upon the database records in the mobile-copy database, said second hash being communicated in its entirety to the network part in a second message via said transmit circuitry on said communications channel, in which said second computational intensity is greater than said first computational intensity and requires a greater amount of communication channel capacity to communicate said second hash second message than said first hash first message, whereby an out of match condition between a record of the mobile-copy database records and a corresponding record of the network-copy database records is determined, and a content retriever to retrieve the out of match database record from the mobile-copy database upon reception via said receive circuitry of a determination of an out of match condition between said mobile-copy database record and said corresponding network-copy database record for communication to the network part, whereby the network-copy database records and the mobile-copy database records are matched to each other.

17. The mobile node of claim 16 wherein said first hash technique comprises a checksum process and wherein said second hash comprises a hash of a first key field of said database record.

18. The mobile node of claim 16 wherein said transmit circuitry and said processing circuitry are configured to deliver mobile-copy database records to the network part, responsive to a determination of an out of match condition between a record of the mobile-copy database records and a corresponding record of the network-copy database records.

* * * * *